Figure 1:
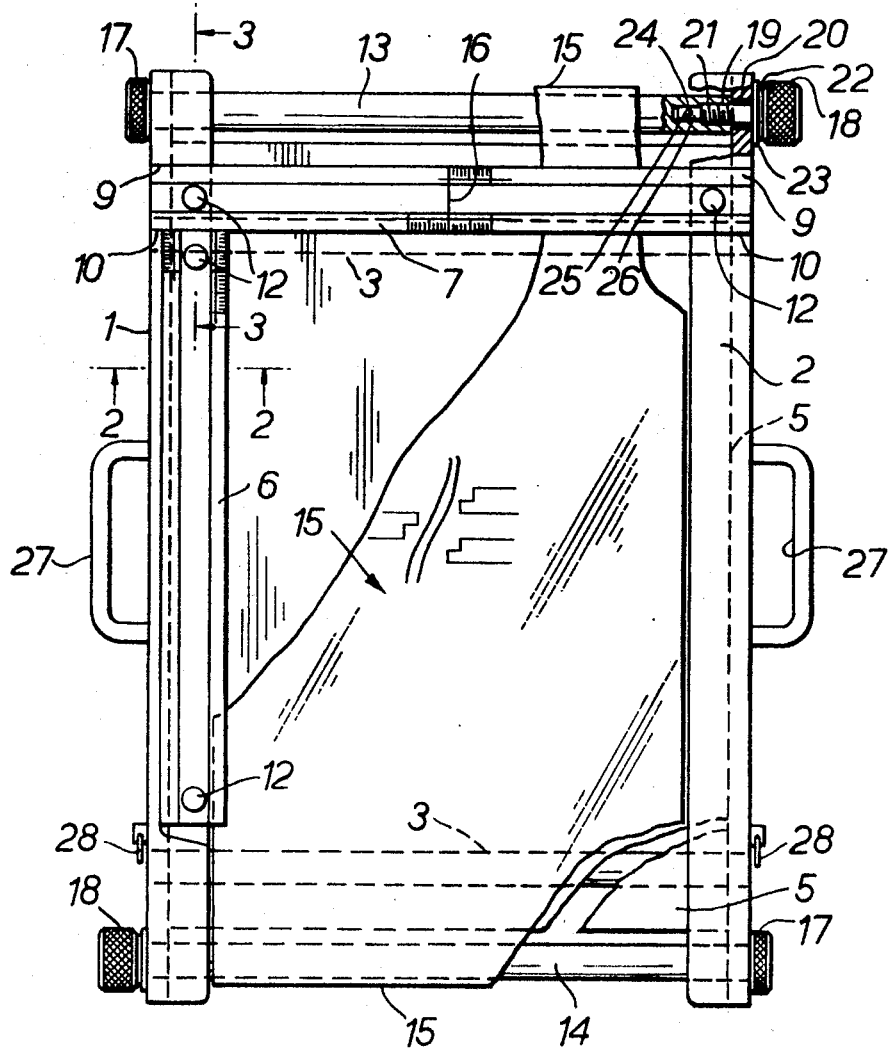

United States Patent

[11] 3,596,360

| [72] | Inventor | David J. Franklin<br>The Maisonette, Yenna, Wolfs Row,<br>Limpsfield, Oxted, Surrey, England |
|---|---|---|
| [21] | Appl. No. | 845,796 |
| [22] | Filed | July 29, 1969 |
| [45] | Patented | Aug. 3, 1971 |
| [32] | Priority | Aug. 1, 1968 |
| [33] | | Great Britain |
| [31] | | 36,856/68 |

[54] APPLIANCE FOR USE IN SURVEYING
4 Claims, 4 Drawing Figs.

| [52] | U.S. Cl. | 33/76 |
| [51] | Int. Cl. | B43l 5/00 |
| [50] | Field of Search | 33/67, 75, 76, 78, 79, 80, 81; 242/67.1 D; 312/231 |

[56] References Cited
UNITED STATES PATENTS

| 397,427 | 2/1889 | Henley | 242/67.1 D |
| 590,696 | 9/1897 | Batson | 33/80 |
| 1,072,908 | 9/1913 | Buda | 33/80 |
| 1,356,971 | 10/1920 | Cnare | 33/80 |

FOREIGN PATENTS

| 1,016,364 | 8/1952 | France | 33/76 |

*Primary Examiner*—Harry N. Haroian
*Attorney*—Cushman, Darby & Cushman

ABSTRACT: An appliance for use in surveying, comprising a board or platen, spaced parallel rollers form one to the other of which a roll of drawing material may be wound so that a section thereof is supported by the board or platen, and longitudinal and transverse scaled rules under with the material may be displaced on the board or platen so that a scaled plan of the site surveyed can be plotted on the material in the field. The rules may each have a flat face and an opposite face bevelled and the flat faces supported by inclined or bevelled faces of a frame which supports the rollers so as to bring the scaled edges of the rules in close relationship with the board or platen and in the same plane while permitting travel of the material under the transverse rule marginally under the longitudinal rule.

PATENTED AUG 3 1971

3,596,360

SHEET 1 OF 2

Inventor
David John Franklin
By Cushman, Darby & Cushman
Attorneys

APPLIANCE FOR USE IN SURVEYING

The present invention relates to an appliance for use in surveying.

The surveyor normally during a surveying operation will take measurements in the area to be surveyed in the direction and transversely of a datum line, e.g., formed by a chain, and record these measurements on appropriately lined sheets and subsequently layout the plan in the drawing office from these measurements.

This may give rise to errors necessitating a further visit to the site. The risk of errors would be lessened if the plan could be drawn in the field, i.e., if the time-consuming chaining and plotting process could take place together.

An aim of the invention is to provide an appliance which permits a scaled plan to be drawn in the field, so that considerable time can be saved in the chaining-plotting operation, greater accuracy promoted, and a field check involving a return visit to the site usually obviated.

To this end the invention provides an appliance comprising a board or platen, spaced parallel rollers from one to the other of which a roll of drawing material may be wound so that a section thereof is supported by the board or platen, and longitudinal and transverse correspondingly scaled rules (straight-edges) under which the material may be displaced on the board or platen preferably in contact with or in close adjacency to the scaled edges of the rules so that the measurements can be plotted on the material and the scaled plan completed by the surveyor or his draughtsman in situ.

The board may be carried by a frame which supports the rollers and to which the rules are fixed.

The said rules may be fixed to the frame so that the scaled edge of one, e.g., at zero thereof, meets the scaled edge of the other, the said edges being substantially in one plane, one rule lying parallel to the direction in which the material will travel and the other at right angles thereto.

The rules may be formed each with a flat face and so that the opposite face has a bevelled margin or margins and the flat faces of the rules may rest on inclined or bevelled faces of side members of the frame so as to bring their scaled edges in as close a relationship with the board or platen as possible while permitting travel of the material under the transverse rule or rules and marginally under the longitudinal rule or rules.

The frame may comprise rigid side bars, e.g., of inverted angle-section metal, with horizontal limbs extending inwardly, i.e., towards one another, and the upper face of the horizontal limb of one bar may be suitably bevelled to support the flat face of the longitudinal rule in a desired inclined plane. The said upper face and the upper face of the horizontal limb of the other bar at a directly opposite position may be recessed to provide shoulders and coplanar inclined bases for supporting the end portions of the transverse rule, the shoulder on the first said bar being substantially coterminous with one end of the longitudinal rule.

The rules may be perforated and headed bolts provided screwed into the side bars of the frame for securing the rules in located position although permitting the rules to be removed and replaced by others showing a different scale or to permit the reversal of the rules to bring opposite scaled margins into position.

Provision may be made for controlling the tension of the material.

The material is preferably a plastics film material chosen to give the maximum stability in different temperatures or weather conditions, but capable of being drawn upon, preferably by pencil.

As is later described, it is advantageous to provide a protractor e.g., a circular protractor, on the upper face of the board or platen, e.g., by etching. This is visible when the material is of a transparent or translucent character.

One or each side bar of the frame may be provided with a handle whereby the appliance may be conveniently carried. If a handle is provided extending from both sides the appliance may be conveniently held for inspecting the plan. If desired eyes or hooks may be provided to permit a shoulder strap to be secured to the appliance.

Figure 2:
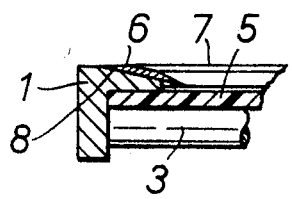
Figure 3:
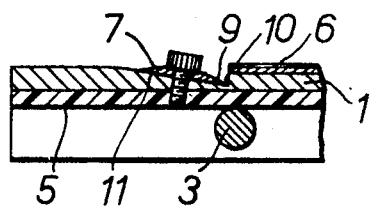
Figure 4:
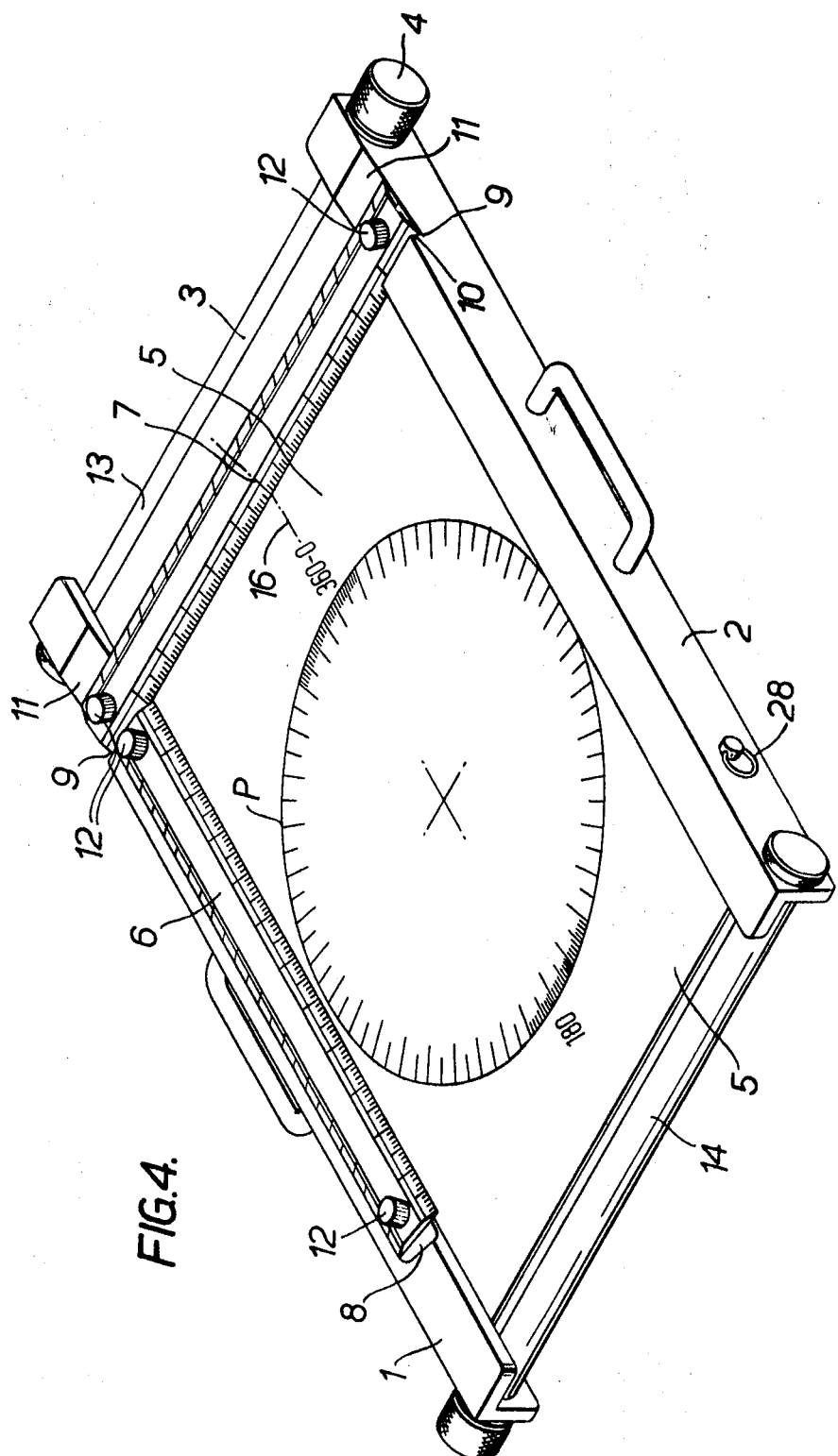

In order that the invention may be the more clearly understood, reference is hereinafter made to the accompanying drawing in which an appliance according to the invention is illustrated by way of example, FIG. 1 being a plan view partly broken away, FIG. 2 a sectional view on the line 2—2 of FIG. 1 and FIG. 3 a sectional view on the line 3—3, FIG. 1. FIG. 4 shows an appliance according to FIGS. 1 to 3 provided with a protractor.

The frame of the appliance comprises side angle bars 1, 2 bridged by cross rods or tubes 3.

Fixed to the underside of the horizontal limbs of the angle bars so as to bridge the space between the vertical limbs thereof is a board or platen 5 of hardboard, plastic or other suitable rigid material. This may provide a smooth white surface or be covered with a film or layer which provides such a surface to form the support for the drawing material hereinafter referred to. The board or platen may be screwed to the horizontal limbs of the angle bars from under the boards.

Two scaled rules or straight edges, viz., 6 and 7 of conventional rule section, i.e., with bevelled or chamfered, scaled margins are provided, the rule 6 being supported along the side bar 1 which is chamfered away to provide an inclined support 8 for the said rule.

Each side bar is also recessed at 9 to provide a shoulder 10 and an inclined base 11, the transverse rule 7 bridging the side bars and resting at each end on the inclined base 11 of the appropriate bar with an edge against each shoulder. The inclined support face and the shoulders are such that the operative edges of the two rules are brought substantially in the same plane close to the upper support surface of the board or platen but with sufficient space for the passage of the drawing material.

Each rule is removably secured by a pair of headed screws or bolts 12 so that the rules can be detached and each reversed to bring an opposite scaled margin into use or to enable differently scaled rules to replace those removed. The two rules used are in any event correspondingly scaled e.g., so that small divisions represent say feet.

The side bars rotatably support rollers 13 and 14 which are adapted to be rotated to wind the drawing material 15 from one to another. The ends of the drawing material are anchored to the winding rollers through slots and with the aid of adhesive tape or in any suitable way and so that such material may extend over the upper surface of the board or platen, under the transverse rule 7 and along one margin under the longitudinal rule 6, so that the material will be suitably supported by the board or platen with the scaled edges of the rules in contact or near relation to the material and in the same plane. The transverse rule may be marked with a datum line 16 and the section of drawing material exposed drawn with a datum line in continuation thereof and from which the offsets are plotted.

Thus a section of the drawing material may be readily made available or a new section brought by the winding action into position. The material in the form of a roll of film or strip is displaceable precisely parallel to the longitudinal rule 6. In scaled relation to the site, points can be plotted in the direction of and laterally of the datum line and the plan completed on the material at the site.

The winding mechanism is designed to permit adjustment of the tension of the drawing material over the board or platen. Each roller (13,14) at each end has a winding knob 17, 18, the two knobs 18, one to each roller, being adapted to be operated to brake the roller. Thus in either direction of travel of the material, the windoff roller may be braked. For this purpose each knob 18 is in the form of a screwbolt 19 journaled in a bearing 20 in the vertical limb of the appropriate side bar and screwed into a threaded socket 21 in the end of the roller. The knob can be turned to screw the bolt more or less in the socket and compress a spring 22 against a washer 23, e.g., of plastics material, so as to bind the washer more or less against the side bar. When a desired setting has been attained the screw can be secured to the roller by a grub screw 24 extending through a radial hole 25 in the roller and engaging a plain end portion 26 of the bolt.

The drawing material may be a transparent or translucent plastics, e.g., polyester based plastics, film or strip, e.g., 10 inches in width and if desired surface treated in any suitable manner to facilitate pencil or other marking. In this case the board or platen is provided with a white material-supporting face e.g., formed by a white paper or by a layer or coating secured to the said board or platen. For film or strip of such a width a board 18 inches long by 12 inches wide will serve.

If desired the material may be cross-ruled to correspond with the scales, graph-paper fashion, or the surface of the board could be so ruled if transparent or appropriately translucent drawing material be used.

The frame may be provided with handles 27 and if desired with swivel eyes 28 to take a shoulder strap. A clip or clips may be provided e.g., on the underside of the board or platen, for one or more pencils or other instruments.

With the aid of the appliance it is possible to plot offsets, to any required scale on either side of the datum line, as fine pencil dots on the film. If a fine pencil line is drawn on the film from the zero of the longitudinal scale 6 along the scaled edge of the transverse scale (chainage datum line) and the appliance held with the transverse scale at the top of the board, the bottom roller may be turned to move the chainage datum line along the edge of the parallel scale. This chainage line can be stopped at any chainage distance and offsets measured and plotted.

If the pencil dots obtained are joined, the survey will be plotted without the necessity for writing down dimensions. As the surveyor proceeds along the chain line, the plotted detail will move down the board as the bottom roller is turned. For example the scale 6 may represent 10 divisions and markings can be made on the film to scale every 100 or 200 feet. The film can be rolled down until the chainage datum line reaches the last hundred division on the parallel scale, when it will be necessary to draw another datum line at the zero of the parallel scale and note alongside the relevant number. It is thus possible to proceed in this manner until the end of this chain line is reached, however long it may be, without losing track of the number of chain lengths completed.

If he so desires, the surveyor can wind back the film and return along the datum line and check the accuracy and fullness of his plotting and then he can proceed from chain line to chain line and follow the same procedure with each line, leaving a gap between plotted chain lines.

In order to facilitate the fixing of detail out of accurate offsetting range, angular graduations in the form of a circular protractor may be provided. An appliance substantially as described with reference to FIGS. 1 to 3 and marked with the same reference numbers to indicate the same parts, is illustrated in FIG. 4. The circular protractor P is etched on the white plastics surface of board 5 with the north and south (180° — 360°) line parallel to and vertically under the datum line. Any point along the chain line can be plotted as a dot or cross on the datum line and the film then wound down until the identified point on the datum line is positioned over the center of the protractor. A theodolite can now be set up over the chosen point on the chain line and the horizontal circle of the theodolite zeroed on the forward station, e.g., sighting post at the end of the chain. It will be seen that it is now possible to observe any required point of detail and plot the bearing directly on the film, the orientation of the protractor obviating the necessity for reducing the angles. If one or more further bearing points on the chain are taken and the measured bearing plotted from the datum line on the film, the position of the object will be found by the intersection of the bearings. However, if tacheometry is employed only one instrument set up will be necessary to fix any point.

By these methods and ordinary offsetting, it is possible to plot all types of detail, no matter how inaccessible, and be sure of accuracy. On completion of the fieldwork, the surveyor will have a roll of film containing the complete survey plotted to scale and he can return to the office with the greater part of his work already done.

The traverse is computed and plotted in the normal way, all stations being plotted directly onto the sheet upon which the fair drawing is to be done. Following that the plotted chain lines are fair drawn directly onto this sheet by tracing through, thereby completely cutting out plotting in the office.

Extensive tests on surveys of varying scales have shown that it is possible to effect chaining and plotting equally as fast as chaining and noting down every measurement. The accuracy is far greater owing to the precise nature of the appliance and of course the detail can be checked as it is measured.

I claim:

1. A portable appliance for use in surveying, comprising a frame, a board or platen fixed thereto, spaced parallel rollers supported by said frame and from one to the other of which a roll of drawing material may be wound so that a section thereof is exposed on the board or platen, and longitudinal and transverse scaled rules under which the material may be displaced on the board or platen so that a scaled plan of the site surveyed can be plotted on the material in the field, each of said rules having a flat face and an opposite bevelled and scaled face, the frame having inclined or bevelled faces and the flat faces of the rules seating on said inclined or bevelled faces so that the scaled edges of the rules are brought into close relationship with the board or platen while permitting travel of the material under the transverse rule and marginally under the longitudinal rule.

2. A portable appliance for use in surveying, comprising a frame, a board or platen carried by the frame, spaced parallel rollers supported by said frame and from one to the other of which a roll of drawing material may be wound so that a section thereof is supported by the board or platen, longitudinal and transverse rules under which the material may be displaced on the board or platen so that a scaled plan of the site surveyed can be plotted on the material in the field, each of the rules having a flat face and a scale on the reverse face, said frame comprising side guide bars for guiding the material, the upper face of a first one of said bars being bevelled to seat the flat face of the longitudinal rule and to support said rule in an inclined plane and the said upper face and the upper face of the second said bar at a directly opposite position being recessed to provide end-locating shoulders for the transverse rule and coplanar bases for seating the end portions of the flat face of the transverse rule, the shoulder on the first said bar being substantially coterminous with one end of the longitudinal rule.

3. A portable appliance for use in surveying, comprising a frame, a board or platen fixed thereto, spaced parallel rollers supported by said frame and from one to the other of which a roll of drawing material may be wound so that a section thereof is exposed on the board or platen, and longitudinal and transverse scaled rules fixed to the board at right angles to one another, one rule being parallel to the direction in which the material will travel, the material being displaceable on the board or platen under the transverse rule and marginally under the longitudinal rule so that a scaled plan of the site surveyed can be plotted on the exposed section of material, each of said rules having a flat face and an opposite scaled face, the frame having inclined or bevelled faces and the flat faces of the rules being supported by said inclined or bevelled faces so that the scaled edges of the rules are brought into close relationship with the board or platen while permitting travel of the material under the transverse rule and marginally under the longitudinal rule, the upper surface of the board or platen bearing a protractor produced on the surface of the board or platen so that it does not interfere with the flat lie of the material on the board.

4. An appliance according to claim 3, in which the protractor is etched on the surface of the board.